Patented Mar. 8, 1932

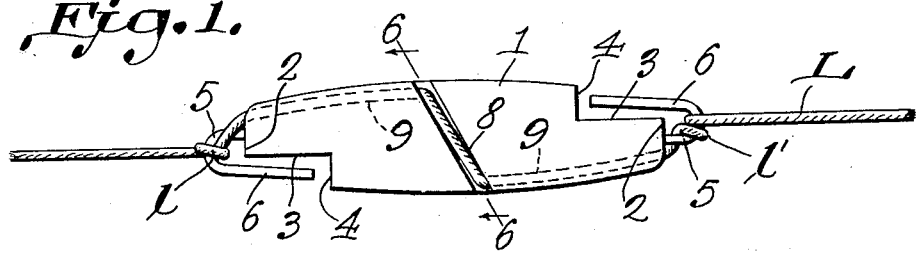
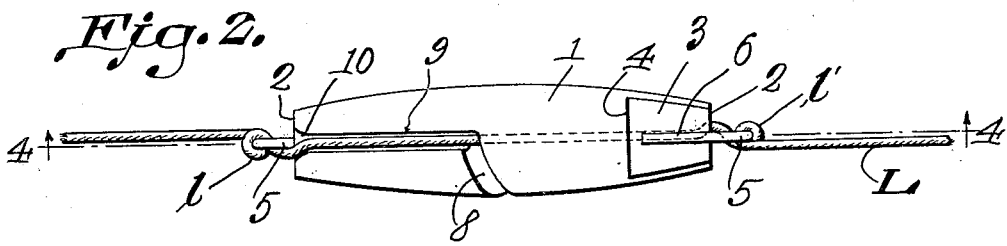
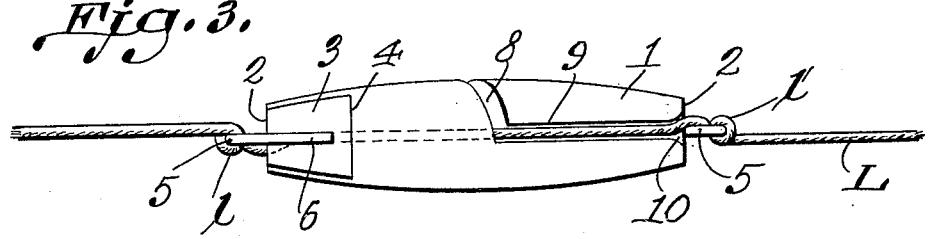
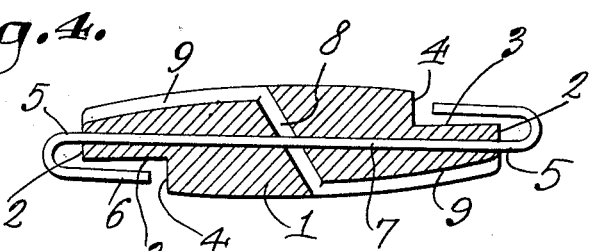
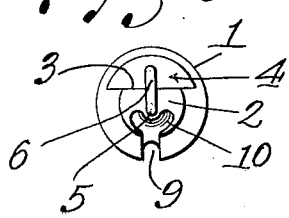
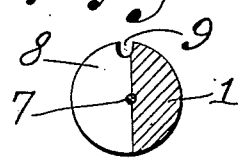

1,848,600

UNITED STATES PATENT OFFICE

ARCHIE E. BEST, OF TIFFIN, OHIO

SINKER

Application filed March 28, 1931. Serial No. 526,093.

This invention relates to a sinker for attachment to fishing lines and any other lines requiring weights.

It is an object of the invention to provide a sinker which can be quickly attached to and detached from a line, it being unnecessary to provide any knots or loops.

It is another object to provide a sinker which will not interfere with other objects attached to the line and which, after being applied to the line, can be shifted readily to any desired position and then made secure without being removed from the line.

A still further object is to provide novel means at the ends of the sinker for engaging the line, said means being so guarded as to be prevented from picking up débris.

A further object is to provide means at the ends of the sinker for engagement by the line for holding the sinker securely in position.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the sinker attached to a line.

Figure 2 is an elevation of one side thereof.

Figure 3 is an elevation showing the opposite side.

Figure 4 is a section on line 4—4, Figure 2.

Figure 5 is an end elevation.

Figure 6 is a section on line 6—6, Figure 1.

Referring to the figures by characters of reference, 1 designates a substantially ellipsoidal body preferably cast of lead or other suitable material and provided with flat ends 2 stepped as at 3 to provide guard shoulders 4 extended in opposite directions respectively. Projecting from the ends of the body are the stems 5 of wire hooks 6 which are bent back so that the free ends thereof will be supported in the recesses formed by the steps and close to the shoulders 4. Thus the shoulders act as guards for preventing the ends of the hooks from catching into or picking up any loose débris adjacent to the sinker. They also prevent the sinker from becoming detached from the line. The hooks are also thus protected so as not to become entangled in the line to which the sinker is anchored or in other lines adjacent thereto.

The stems 5 can be made integral with a wire 7 extended axially through the body although they can be made separate as will be obvious.

Formed within the body 1 at a point between its ends is an obliquely disposed kerf 8 extending preferably to the center of the body. The ends of the innermost portion of the kerf open into grooves 9 extending in opposite directions respectively within the body 1 and opening through the adjacent ends of the body. These grooves are of a depth somewhat greater than the thickness or gauge of the line with which the sinker is to be used. The outer ends of the groove 9 are preferably flared as at 10 so as to facilitate wrapping the line about the adjacent stem 5.

When it is desired to attach the sinker to a line L said line is wrapped about one of the hooks 6 as shown at $l$ and then laid within the adjacent groove 9, brought transversely of the body within kerf 8, laid in the second groove 9, and then wrapped about the other hook 6 as shown at $l'$. Thus the sinker can be attached to the line at any point desired without cutting the line and without forming the usual knots or loop. As the grooves are of sufficient depth to completely shield those portions of the line therein, the line will be fully protected when dragged over an abrading surface or substances which might cut or mutilate the cord.

Should it be desired to move the sinker to another position on the line, it would be necessary merely to unwrap the line from the hooks. The sinker can then be slid to any point desired without leaving the line and thereafter by again wrapping the line on the hooks the sinker will be held in place securely.

Obviously other arrangements of the grooves and kerf may be employed in lieu of the one disclosed without departing from the spirit of the invention as claimed, it being essential that the grooves, kerf, or other means provided for receiving the line between the ends of the body be tortuous from end to end.

What is claimed is:

1. A sinker including a body having a guard shoulder adjacent to each end, a line-receiving kerf between the ends, and grooves communicating with the kerf and extending to the ends of the body, and a hook extending from each end of the body and terminating close to the adjacent guard shoulder.

2. A sinker including a body recessed at each end to provide a guard shoulder, and a line engaging hook extending from each end of the body and terminating close to the adjacent shoulder, there being tortuous means opening through the surface of the body between the ends thereof providing a seat for that portion of a line between the hooks.

3. A sinker including a body recessed at each end to provide a guard shoulder, and a line engaging hook extending from each end of the body and terminating close to the adjacent shoulder, there being tortuous means opening through the surface of the body between the ends thereof providing a seat for that portion of a line between the hooks, said means including a kerf and grooves communicating therewith.

4. A sinker including a body recessed at each end to provide a guard shoulder, and a line engaging hook extending from each end of the body and terminating close to the adjacent shoulder, there being tortuous means opening through the surface of the body between the ends thereof providing a seat for that portion of a line between the hooks, said means including spaced grooves extending to the ends of the body and a connection between the grooves.

In testimony that I claim the foregoing as my own, I have hereto affixed my signature.

ARCHIE E. BEST.